United States Patent
Suzuki et al.

(10) Patent No.: US 10,421,166 B2
(45) Date of Patent: Sep. 24, 2019

(54) MACHINING CENTER

(71) Applicant: MAKINO MILLING MACHINE CO., LTD., Tokyo (JP)

(72) Inventors: Toshihiro Suzuki, Aiko-gun (JP); Shinji Terakawa, Aiko-gun (JP); Takuma Kawarasaki, Aiko-gun (JP); Kenichiro Suzuki, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 15/764,699

(22) PCT Filed: Sep. 30, 2015

(86) PCT No.: PCT/JP2015/077794
§ 371 (c)(1),
(2) Date: Mar. 29, 2018

(87) PCT Pub. No.: WO2017/056253
PCT Pub. Date: Apr. 6, 2017

(65) Prior Publication Data
US 2018/0304424 A1    Oct. 25, 2018

(51) Int. Cl.
*B23Q 1/48* (2006.01)
*B23Q 1/01* (2006.01)
(Continued)

(52) U.S. Cl.
CPC .............. *B23Q 1/015* (2013.01); *B23Q 1/48* (2013.01); *B23Q 1/488* (2013.01); *B23Q 1/58* (2013.01);
(Continued)

(58) Field of Classification Search
CPC ............ Y10T 82/2511; Y10T 82/2512; Y10T 409/308288; B23Q 1/01; B23Q 1/62; B23Q 1/015; B23Q 1/25; B23Q 1/26
See application file for complete search history.

(56) References Cited

U.S. PATENT DOCUMENTS 3,998,127 A * 12/1976 Romeu ................. B23C 1/14
                                                    409/225
5,688,084 A * 11/1997 Fritz .................... B23Q 1/03
                                                    310/13
(Continued)

FOREIGN PATENT DOCUMENTS

CN       101112745       1/2008
CN       103949895       7/2014
(Continued)

OTHER PUBLICATIONS

International Search Report dated Dec. 8, 2015, directed to International Application No. PCT/JP2015/077794; 2 pages.

*Primary Examiner* — Willmon Fridie, Jr.
(74) *Attorney, Agent, or Firm* — Morrison & Foerster LLP

(57) ABSTRACT

An upright machining center is characterized in being provided with: x-axis guides for moving and guiding a table in the left-right direction on a bed; a column provided on the bed and provided with an opening that straddles the x-axis guides in the front-back direction so that a moving body, on which the table is provided, can enter therein in the left-right direction; a saddle, which is disposed on the upper part of the column so as to be movable in the front-back direction and for which a first y-axis guide that extends in the front-back direction on the right side of the left-right direction and a left second y-axis guide that is located lower and parallel thereto (Continued)

are provided; and a main shaft head, which is disposed on the left side surface of the saddle and moves in the vertical direction.

3 Claims, 8 Drawing Sheets

(51) Int. Cl.
  *B23Q 1/58* (2006.01)
  *B23Q 11/08* (2006.01)
  *B23Q 1/62* (2006.01)
(52) U.S. Cl.
  CPC .............. *B23Q 1/621* (2013.01); *B23Q 11/08* (2013.01); *B23Q 11/0825* (2013.01)

(56) References Cited

U.S. PATENT DOCUMENTS

| | | | | |
|---|---|---|---|---|
| 6,948,894 B2* | 9/2005 | Taga | ...................... | B23Q 1/012 269/57 |
| 9,346,138 B2* | 5/2016 | Lechleiter | .............. | B23Q 1/012 |
| 2002/0017888 A1* | 2/2002 | Ueda | ................... | B23Q 16/025 318/567 |
| 2006/0270540 A1* | 11/2006 | Takayama | .............. | B23Q 1/012 483/41 |
| 2008/0175684 A1* | 7/2008 | Schmidt | ................. | B23Q 1/012 409/212 |
| 2011/0070044 A1* | 3/2011 | Kawada | ................. | B23Q 1/015 409/162 |
| 2013/0207331 A1 | 8/2013 | Jung et al. | | |

FOREIGN PATENT DOCUMENTS

| | | |
|---|---|---|
| CN | 203817472 | 9/2014 |
| DE | 10245058 A1 | 4/2004 |
| EP | 0879671 | 11/1998 |
| EP | 1402991 | 3/2004 |
| FR | 2907355 A1 | 4/2008 |
| JP | 60-167730 | 8/1985 |
| JP | 10-43975 | 2/1998 |
| JP | 10-277857 | 10/1998 |
| JP | 2002-126972 | 5/2002 |
| JP | 2002-326137 | 11/2002 |
| JP | 2008-23709 | 2/2008 |
| JP | 2013-158908 | 8/2013 |
| JP | 2015-51493 | 3/2015 |
| WO | 2009/144831 | 12/2009 |

* cited by examiner

PRIOR ART

MACHINING CENTER

CROSS REFERENCE TO RELATED APPLICATION

This application is a U.S. National phase patent application of International Patent Application No. PCT/JP2015/077794, filed Sep. 30, 2015, the contents of which is hereby incorporated by reference in the present disclosure in its entirety.

FIELD OF THE INVENTION

The present invention relates to a machine tool for machining a workpiece by relatively moving a tool and the workpiece. In particular, the present invention relates to a vertical machining center improved to reduce the installation space for the machine while increasing the rigidity of the machine.

BACKGROUND OF THE INVENTION

Patent Literature 1 discloses a five-axis vertical machining center, as shown in FIG. 1. This prior art machining center includes a bed 13 as a base, a column 15 mounted on the bed 13, a rotary table 35 arranged on a moving body 27 which moves left and right on the bed 13, a spindle head 21 supporting a spindle 25, and a saddle 17 supporting the spindle head 21 so as to be vertically movable in the Z axis direction on the left side face of the column 15. A pair of rails 29a, 29b are provided in the bed 13, and the moving body 27 is provided so as to be capable of reciprocating in the lateral directions on the bed 13 along the rails 29a, 29b.

In this prior art, the saddle 17 is provided on the left side face of the column 15 to move back and forth in the Y-axis direction, and disposed between the column 15 and the spindle head 21, wherein the spindle head 25 is overhung with a large horizontal distance from the column 15, resulting in a greater structure in order to maintain the machine rigidity and damping performance. Therefore, the whole size of the machine is increased, requiring a larger installation space. In Patent Literature 2 discloses a machine tool having a slanted column configured so as to increase the machine rigidity. However, in the prior art of Patent Literature 2, a moving mechanism, which moves in a top face of a bed, is disposed at a position away from a column, since the movable range thereof is not allowed sufficiently because of obstruction by a column. Therefore, a machining head is overhung so as to reach the position away from the column, resulting in the problem similar to that of the prior art of Patent Literature 1.

PATENT DOCUMENT

Patent Document 1: WO 2009/144831
Patent Document 2: JP-A-H109-277857

BRIEF SUMMARY OF THE INVENTION

The technical object of the present invention is to solve the above-mentioned problems of the prior art, and to provide a vertical machine tool improved to reduce the space required to install the machine while increasing the machine rigidity.

In order to achieve the above objectives, the present invention provides a vertical machining center for machining a workpiece by relatively moving a tool and the workpiece, comprising an X-axis guide configured to guide a table in left and right direction on a bed; a column provided on the bed and having an opening formed to span the X-axis guide in forward and backward direction so as to allow the table to enter in the left and right direction; a saddle provided to move in the forward and backward direction along a first Y-axis guide extending in the forward and backward direction and a second guide which are disposed at a top portion of the column, the second guide disposed below, parallel to and offset in the left and right direction from the first Y-axis guide; and a spindle head disposed at a side of the saddle close to the second Y-axis guide so as to move in the vertical direction.

According to the present invention, the space is reduced by a configuration of an opening formed at a lower part of the column so that the table moves into the lower part of the column. Further, the configuration of the saddle mounted onto the top portion of the column so as to reduce the overhang of the spindle, while increasing the rigidity of the machine by forming the top portion of the column into a slant shape. As a result, the present invention provides a vertical machining center improved to reduce a space required to install the machine, while increasing the machine rigidity.

DETAILED DESCRIPTION OF THE INVENTION

An embodiment of the present invention will be described below with reference to FIGS. 2 to 4.

Figure 1:
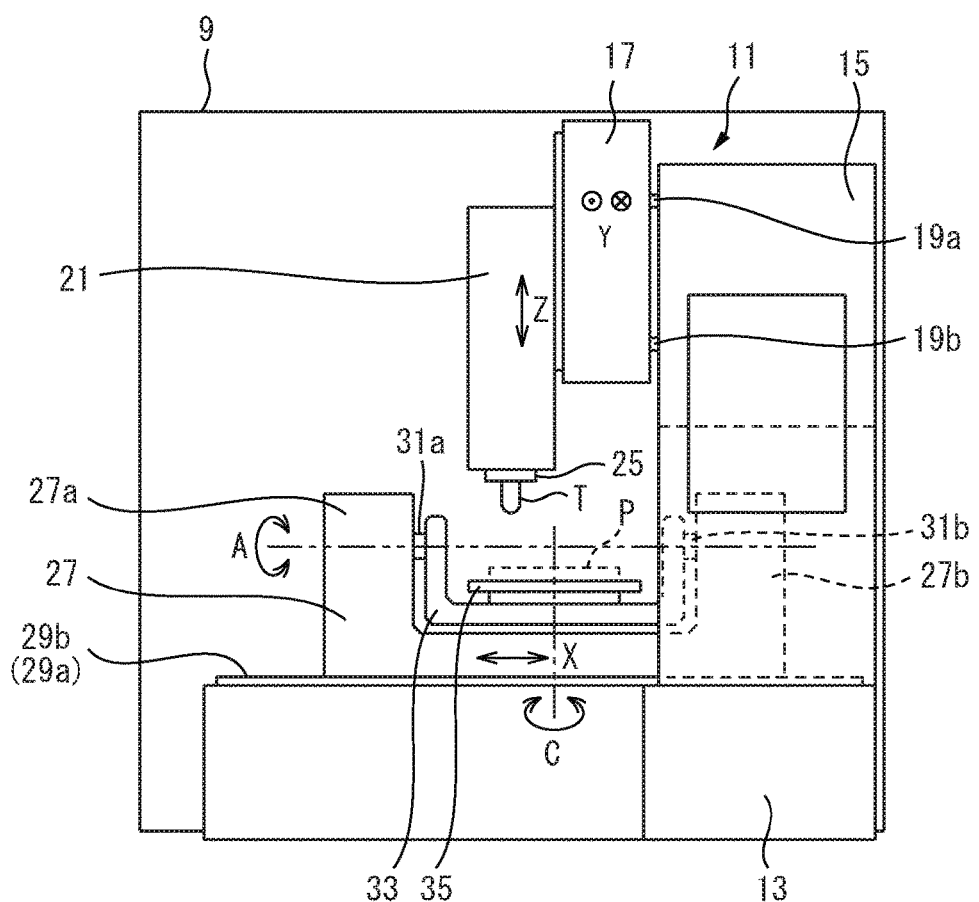
FIG. 1 is a front view of the prior art machine tool of Patent Literature 1.
Figure 2:
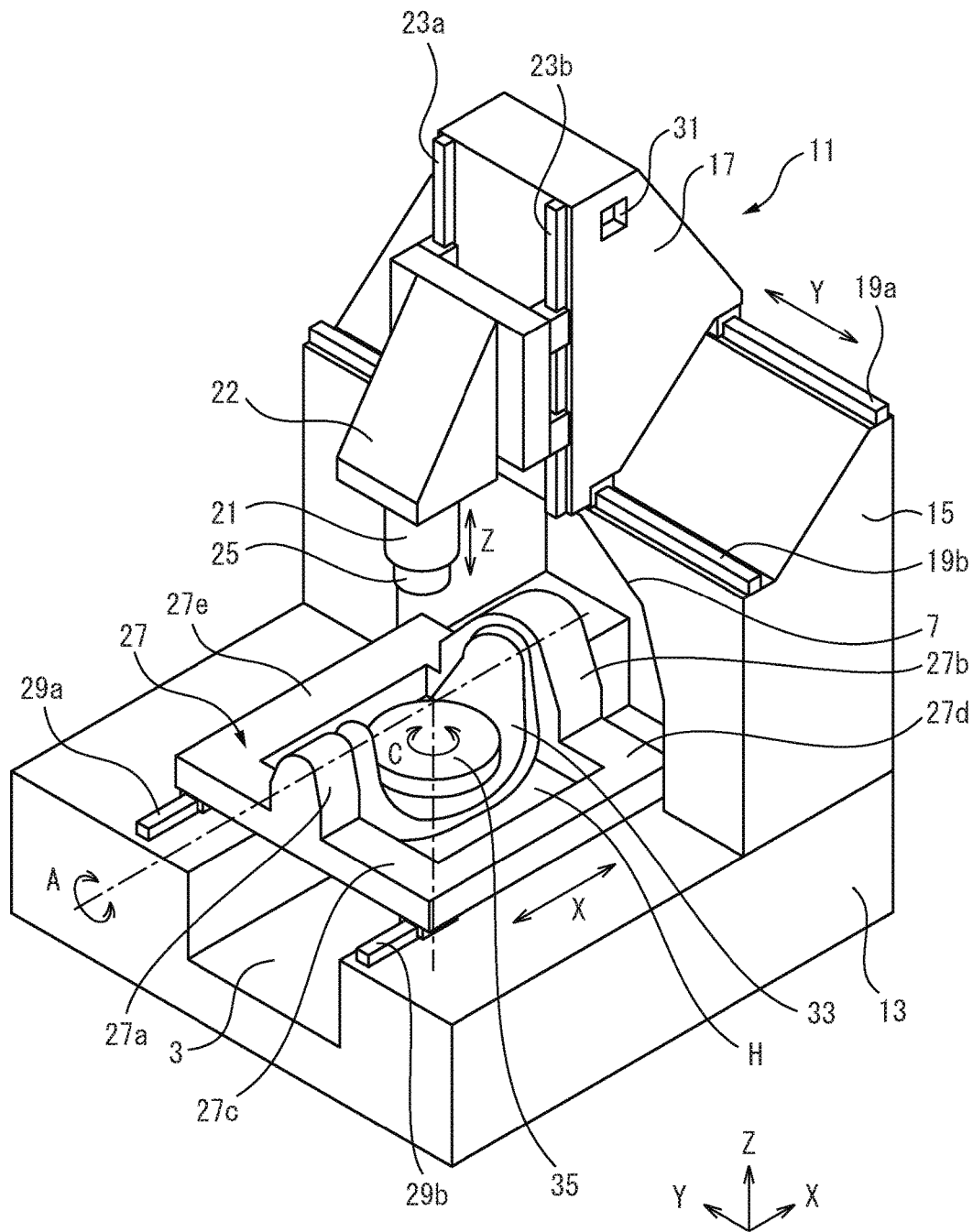
FIG. 2 is a perspective view of a machining center according to a first embodiment of the present invention.
Figure 3:
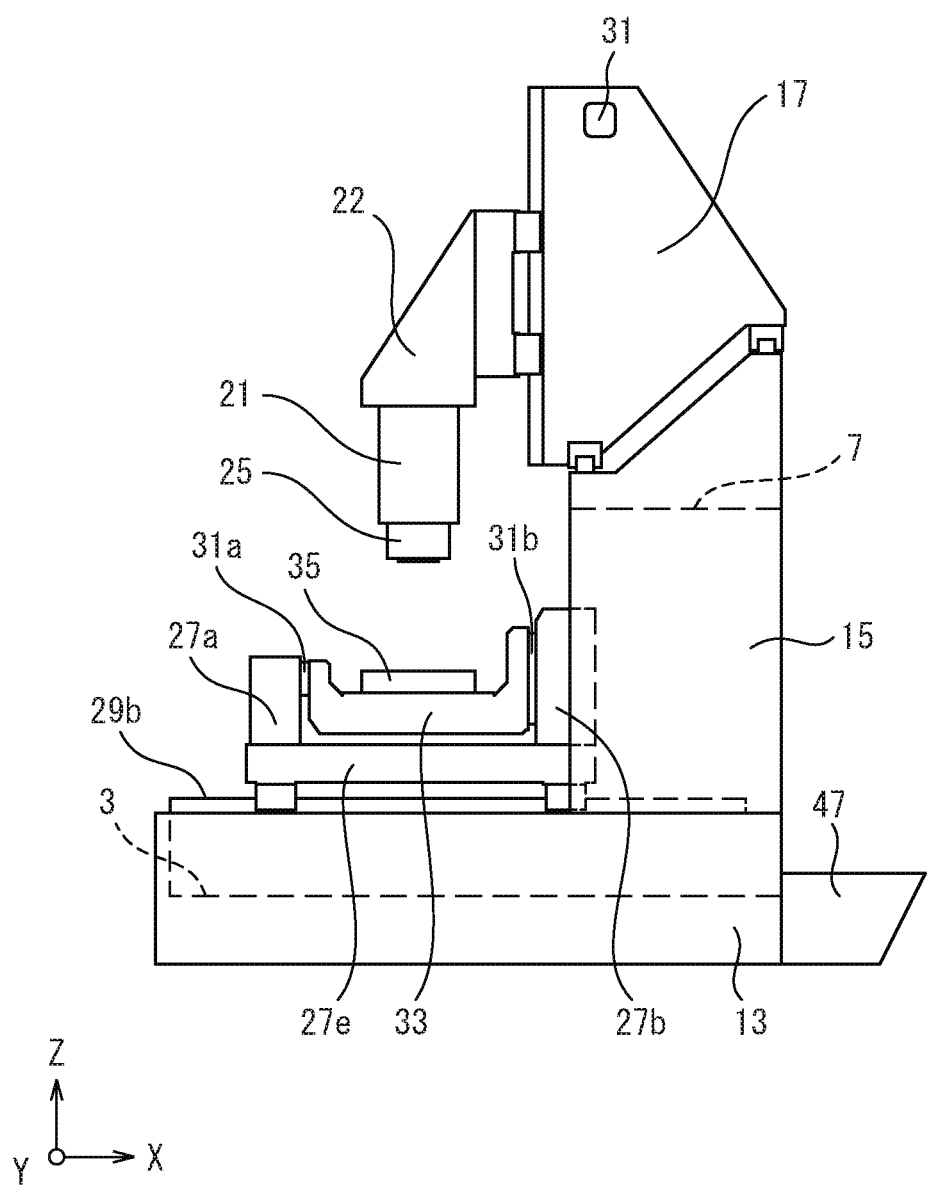
FIG. 3 is a front view of the machining center according to the first embodiment of the present invention.

A vertical machining center 11, according to a first embodiment of the present invention, as shown in FIG. 2, includes, as main constituent elements, a bed 13 as a base, a trough 3 provided in the bed 13 and configured to collect swarf, a slant-shaped column 15 mounted on the bed 13, a saddle 17 arranged so as to be able to move back and forth on the column 15, a head stock 22 which moves vertically with respect to the saddle 17, a spindle head 21 supporting the spindle 25 so as to allow the spindle 25 to rotate around the vertical axis (Z axis), and a moving body 27 which moves on the bed 13 in the left and right directions and which includes a rotary table 35. The spindle head 21 is mounted in the head stock 22, and a tool T (not shown) can be attached to the spindle 25. The first embodiment is described in relation to a five-axis vertical machining center, however the invention is not limited thereto. The configuration of the moving body 27 will be described later.

In the present embodiment, as shown in FIG. 2, the rotary table 35 as a table (workpiece table) can move in the x axis direction corresponding to the left and right directions with respect to the bed 13. The Y axis is defined as the direction perpendicular to both the X axis direction and the Z axis of the spindle 25. The moving body 27 includes a cradle 33 both ends of which are supported so as to be rotatable in the A axis directions through a rotating shaft which is parallel to the X axis. A rotary table 35 which is rotatable in the C axis directions is provided in the cradle 33. Thus, the moving body 27 can move in the X axis direction, which is the left and right directions of the bed 13, the saddle 17 can move in the Y axis direction, which is the forward and backward directions, and the spindle head 21 can move in the Z axis direction, which is the vertical direction. The C axis and the A axis are defined as usual. The present invention may be applied to a machine tool in which the X axis may be defined as the forward and backward directions of the rotary table 35 and the Y axis may be defined as the direction perpendicular to both the X axis and the Z axis. The table 25 need not necessarily be a rotary table. The table 35 be mounted directly to the moving body 27. A pallet P and the workpiece, etc., are attached to the table.

The top portion of the column 15 is inclined such that the top surface is formed in a slant shape, the machining area side of the column 15 is positioned on the lower side, and two linear guide rails are provided. As these rails, a first Y axis guide 19a is provided on the upper side of the inclination of the column 15, and a second Y axis guide 19b is provided on the lower side of the inclination of the column 15. The first Y-axis guide 19a is provided at the right side in the left and right direction, and the second guide 19b is positioned lower than the first Y-axis guide 19a and parallel to the first Y-axis guide. A Y axis feeding means is provided between the first Y axis guide 19a and the second Y axis guide 19b. The Y axis feeding means includes a ball screw (not shown; mounted on the column) extending in the Y-axis direction and a Y-axis feed motor (not shown) connected to one end of the ball screw, and the saddle 17 includes a nut (not shown) which engages with the ball screw. This feeding means is hereinafter referred to as a "linear feed axis drive mechanism".

A pair of Z-axis guides 23a, 23b extend on the left side surface (the machining area side) of the saddle 17. The head stock 22 is attached to the saddle 17 so as to be able to reciprocate in the vertical direction on the Z-axis guides 23a, 23b. The saddle 17 and the head stock 22 are provided with a linear feed axis drive mechanism as a Z-axis feed means. The lower end of the left side surface of the saddle 17 can be moved to a position close to the workpiece W, since the top portion of the column 15 is formed in a slant shape. The lower end of the stroke of the head stoke 22 in the Z-axis direction can be lowered, enabling to reduce of the machine height with the rigidity maintained.

A rear-side first X axis guide 29a and a front-side second X axis guide 29b extend on the bed 13. The moving body 27 is mounted so as to reciprocate on the bed 13 along the first X axis guide 29a and the second X axis guide 29b. A linear feed axis drive mechanism 39 (refer to FIG. 4) as X axis feeding means is installed between the bed 13 and the moving body 27 in a position in which the linear feed axis drive mechanism 39 does not overlap the trough 3. In other words, the linear feed axis drive mechanism 39 is installed on the bed between the trough 3 and the first X axis guide 29a. The moving body 27 can partly enter an opening 7 in the form of an arch-shaped tunnel in the column 15 by the linear feed axis drive mechanism 39. While the linear feed axis drive mechanism 39 is disposed at the rear side of the moving body 27 in FIG. 4, the present invention is not limited thereto.

The sectional shape of the opening 7 may be any shape, as long as the opening does not obstruct the passage of the moving body, such as a circular, arch, rectangular, polygonal shape. The configuration which allows the table 35 moves into the lower part of the column 15 by forming the lower part of the column 15 into an arch shape, whereby reducing the space in the X-axis directions. Additionally, in the present embodiment, the top portion of the column 15 is formed into a slant shape, whereby reducing the machine height. This allows a compact structure, while increasing the machine rigidity.

As shown in FIG. 2, the moving body 27 is composed a left-side first beam member 27c, a right side second beam member 27d, and front and rear connecting members 27e and 27e which connect the first beam member 27c and the second beam member 27d. The moving body 27 is composed of an approximate quadrangle (square shape) in which a cavity H is formed in the center, as viewed from above. In the present embodiment, the cavity H is formed in the center of the X axis moving body 27, which moves in the left and right directions. The cradle 33, which rotates in the A axis direction, is arranged in the cavity H. As a result, accumulated swarf can fall directly into the trough 3.

Figure 4:
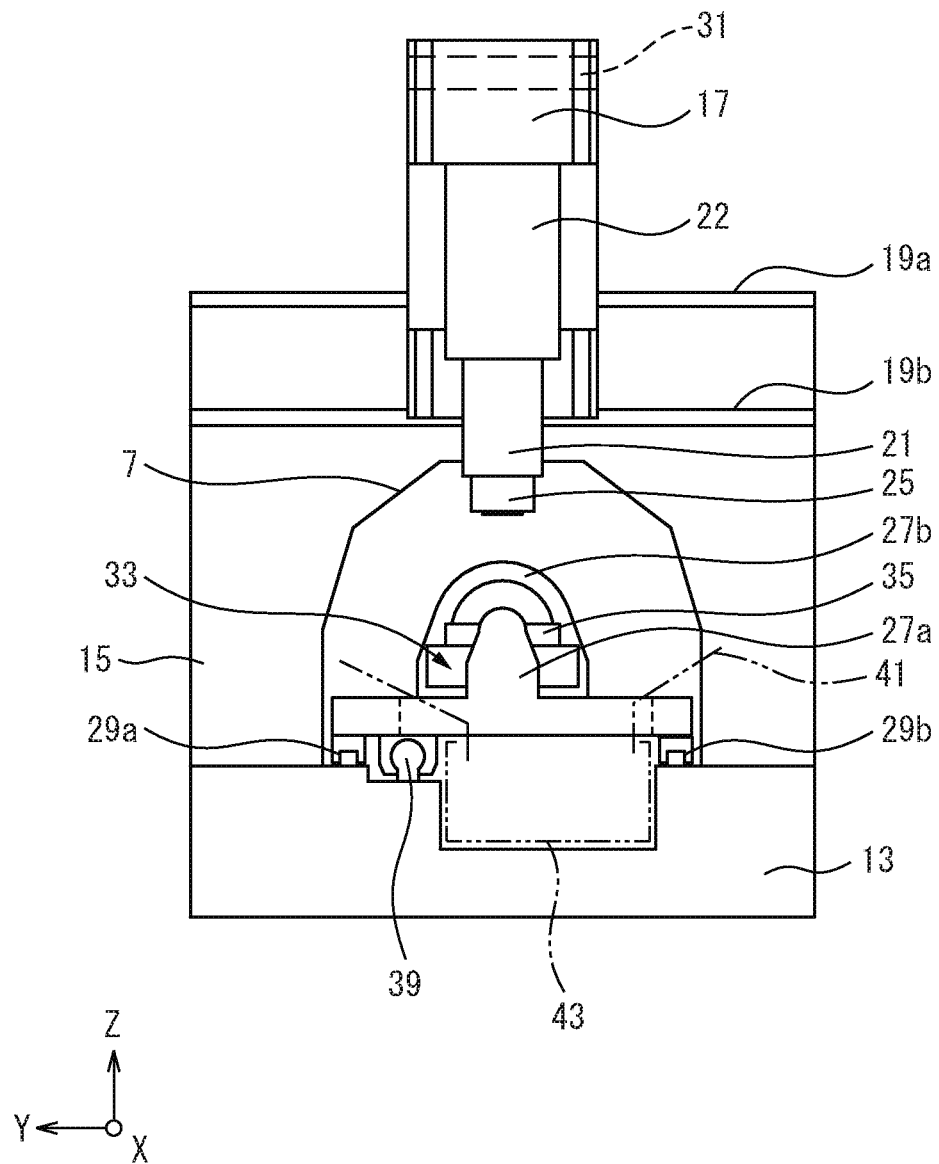
FIG. 4 is a side view of the machining center according to the first embodiment of the present invention.

In the bed 3, the trough 3 configured to recover the swarf is formed into a groove shape in the X-axis direction having a sheet metal swarf receiver 43 incorporated therein (FIG. 4). The longitudinal direction of the trough 3 is parallel to the X axis direction. In the present embodiment, the trough 3 is formed as a groove having a rectangular cross section. The cross-section of the trough 3 is not limited to a rectangle and may be any other shape. The cavity H at the center of the moving body 27 is open from the top to the trough 3 side, so that the swarf can fall directly into the trough 3. The supports 27a, 27b are attached integrally or separately to the left side first beam member 27c and the right side second beam member 27d of the moving body 27, respectively. The left side first beam member 27c includes the support 27a and the right side second beam member 27d includes the support 27b.

In the supports 27a, 27b of the moving body 27, the cradle 33 is supported by the pivot shafts 31a, 31b (FIG. 3) so as to be rotatable in the A axis direction. An electric motor for pivoting the cradle 33 is incorporated in the right side support 27b. Therefore, even if the size of the right side support 27b is increased, it can be moved into the opening in the form of an arch in the lower part of the column, enabling the X-axis length to be reduced.

The rotary table 35 configured to hold the workpiece and the pallet P is mounted on the cradle 33 so as to be rotatable in the C axis direction. The front and rear connecting members 27e, 27e are installed so as to cover the first X axis guide 29a and the second X axis guide 29b and so as not to cover the trough 3. Slant covers 41 shown in FIG. 3 are provided on the front and rear connecting members 27e, 27e so that the swarf can be satisfactorily discharged. Similarly, slant covers 41, which are telescoping covers, are provided on the outside of the moving body 27 to cover the first X axis guide 29a and the second X axis guide 29b. In other words, the slant covers 41 configured to guide the swarf into the trough 3 are arranged so as to cover the linear feed axis drive mechanism 39, the first X axis guide 29a, and the second X axis guide 29b. Since the widths of the cradle 33 and the rotary table 35 are approximately the same, swarf does not accumulate, and drops directly into the trough 3. The swarf drops into the swarf receiver 43 of the trough 3 along the slant cover 41 leading to the trough 3, and is then collected in a tank 47 by a conveyor (not shown) or blown air. Although telescoping covers have been described as an example of the slant covers 41 on the outside of the moving body 27, the slant covers 41 on the outside of the moving body 27 may be integral sheet metal covers fixed to the connecting members 27e, 27e, or may be winding type covers or bellows type covers.

As shown in FIG. 4, the pivot shafts 31a, 31b which rotate the cradle 33 in the A axis direction may be supported by the first beam member 27c and the second beam member 27d in such a way that the pivot shafts are offset toward the side opposite of the operator with respect to the center in the longitudinal direction of the trough 3. Since the center of rotation of the A axis is shifted backward, the cavity H where the swarf falls is wider on the operator side. In addition, such a configuration improves the accessibility of the operator. Further, since the center of rotation of the A axis is shifted backwards so that the position of the center of gravity is shifted backwards, the distance between the center of gravity position and the linear feed axis drive mechanism 39 of the X-axis feed means is shortened, increasing mechanical rigidity.

Figure 5:
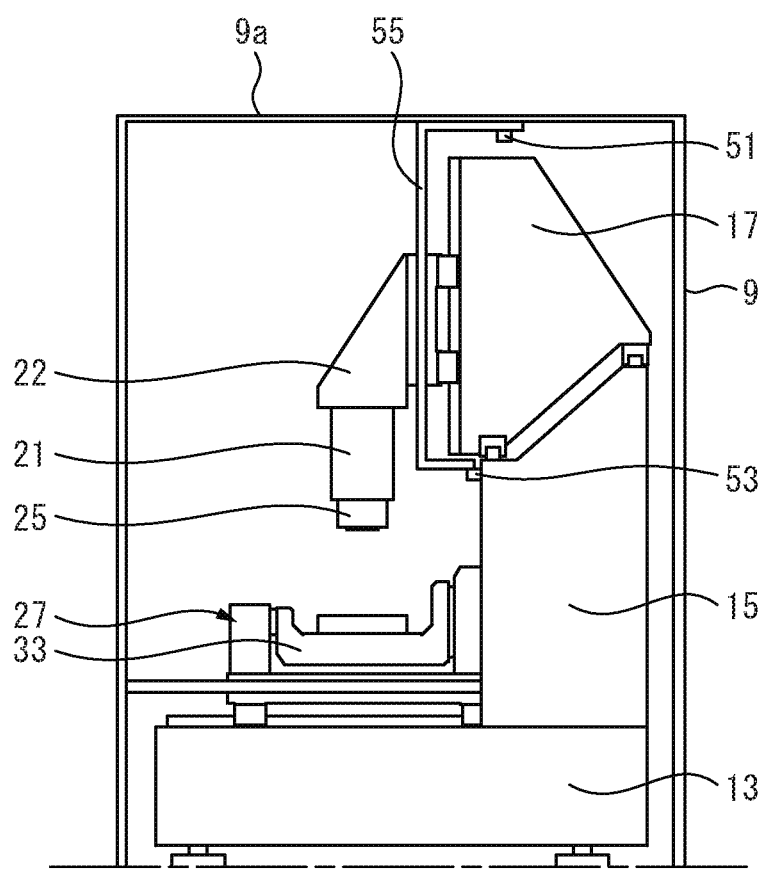
FIG. 5 is a front view of the machining center according to the first embodiment of the present invention.
Figure 6:
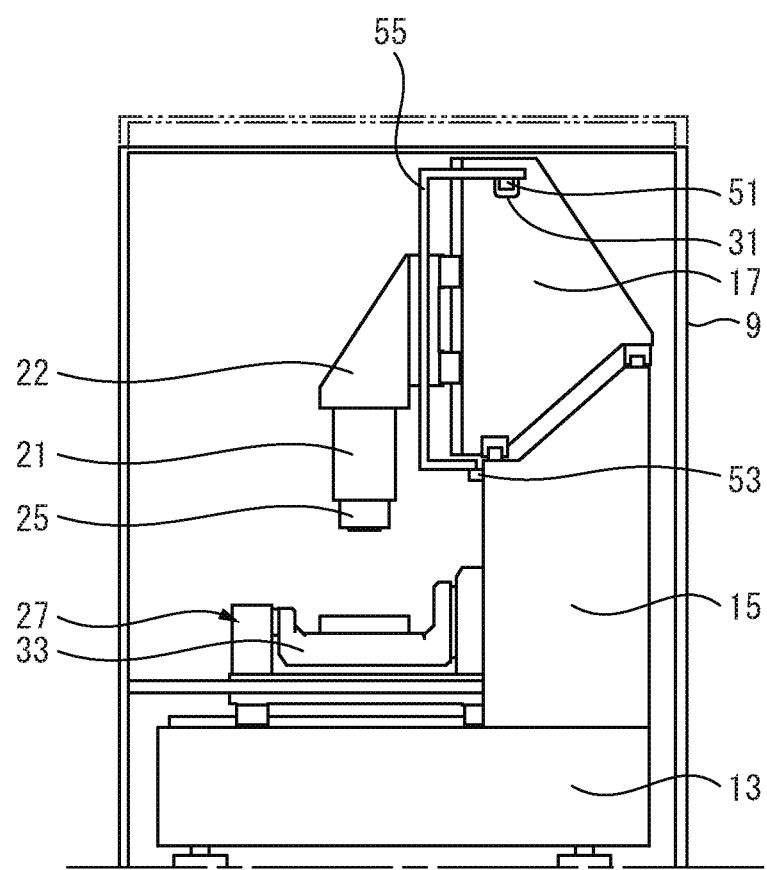
FIG. 6 is a front view of a machining center according to a second first embodiment of the present invention.
Figure 7:
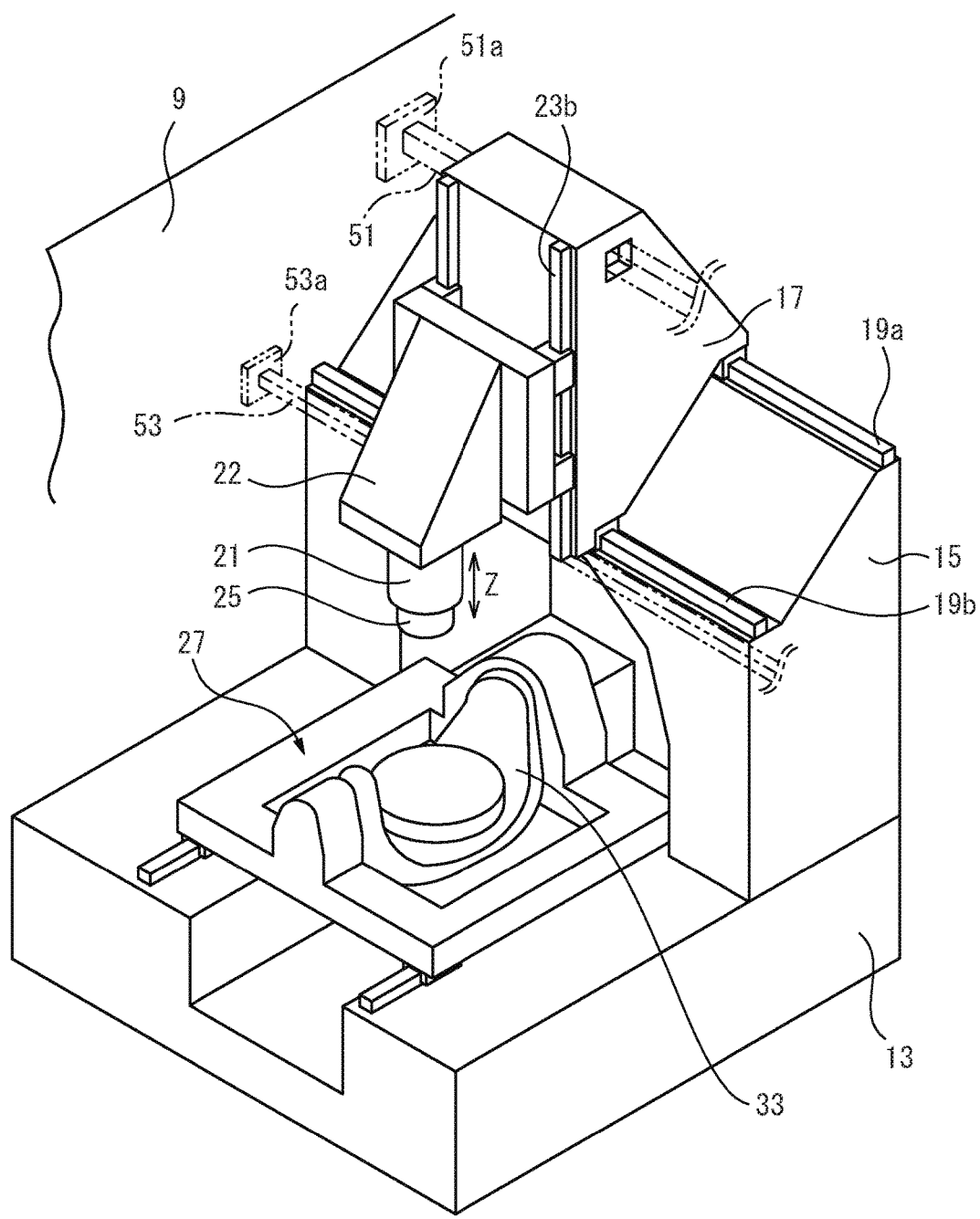
FIG. 7 is a perspective view of the machining center according to the second embodiment of the present invention.

With reference to FIGS. 5-7, a second embodiment of the present invention will be described below. FIG. 5 is a front view of the first embodiment, wherein a upper guide rail 55, configured to support a Y-axis protection cover 33 so as to slide, is provided on a ceiling 9a of a splashguard 9 above the saddle 17.

On the other hand, in the second embodiment, an Y-axis protection cover 55 is supported, as shown in FIGS. 6 and 7, by an upper guide rail 51, which passes through a through hole 31 formed in the saddle 17, and a lower guide rail 53. As shown in FIG. 7, the upper and lower guide rails 51 and 53 extend between the front and rear splashguards 9 and secured thereto by metal fittings 51a and 53a. The Y-axis protection cover 55 is guided by the upper and lower guide rails 51 and 53 and secured between the saddle 17 and the rear side splashguard 9 and between the saddle 17 and the front side splashguard 9. The other configurations are the same as those of the first embodiment.

As a result, the Y-axis protection cover 55 is extended and retracted along with the movement of the saddle 17 in the forward and backward directions. A stainless extendable cover, e.g., an armored bellows cover, a telescopic cover or the like may be preferably employed as the Y-axis protection cover 55. The Y-axis protection cover 55 covers the first and second Y-axis guides 19a and 19b so as to protect them from swarf or the like.

In the present embodiment, the upper end of the Y-axis protection cover 55 is positioned lower than the height of the saddle 17 by passing the upper guide rail 51, for slidably supporting the Y-axis cover 55, through the through hole 31 formed in the saddle 17. In the embodiment of FIG. 5, the height of the entire machine is slightly tall. On the other hand, in the second embodiment, the height of the entire machine can be made lower than the height indicated by the imaginary line in FIG. 6. Therefore, a machine installation space required to install a vertical machining center can be reduced. This allows a machine to be accommodated in a container of regular size, or to be transported easily through an entrance of a factory.

Figure 8:
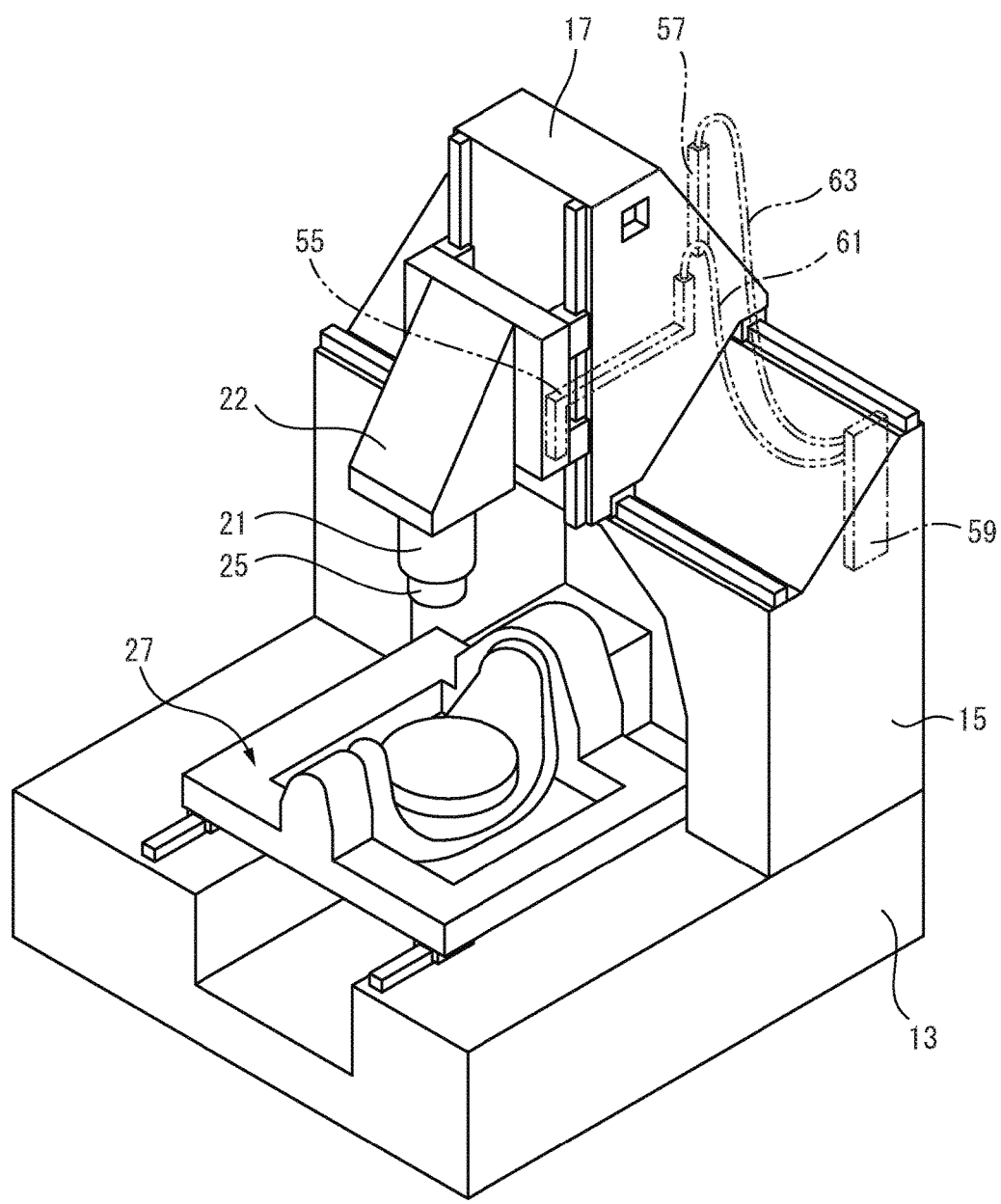
FIG. 8 is a perspective view of a machining center according to a third embodiment of the present invention.

FIG. 8 shows a third embodiment.

In the present embodiment, a surplus space, generated by forming the top portion of the column 15 into a slant shape, is effectively used for extending cables and pipes. The present embodiment is characterized by effectively extending electric wires for electric power or control, such as a cabtyre cable or the like and/or flexible pipes for coolant, machining fluid or the like by using the surplus space.

The cables, hoses or the like are extended through a first fixture 55, secured to the head stock 22, so as to be loosely held above the slant-shaped top portion of the column 15. Further, they are extended through a first fixture 57, secured to the saddled 17, so as to be loosely held above the slant-shaped top portion of the column 15. The opposite ends of these electric wires and pipes are disposed at sources for the electric wires and pipes through a second fixture 59, secured to the column 15. This allows a space above the slant-shaped top portion of the column 15, whereby the height of the machine can be reduced. In this case, the electric wires and pipes 61 loosely held between the first fixture 55 of the head stock 22 and the second fixture 59 of the column can absorb the movements in the Y-axis and Z-axis. The electric wires and pipes 63 loosely held between the first fixture 57 of the saddle 17 and the second fixture 59 of the column can absorb the movements in the Y-axis.

Note that the technical scope of the present invention is not limited to the embodiments described above, and includes various modifications to the embodiments within a range which does not deviate from the purpose of the present invention. In other words, the specific configurations described in the embodiment are merely exemplary, and can be appropriately changed.

REFERENCE SIGNS LIST

11—Machine Tool
13—Bed
15—Column
17—Saddle
19a, 19b—First Y-axis Guide, Second Y-axis Guide
21—Spindle Head
22—Head stock
25—Spindle
27—Moving Body
33—Cradle
35—Rotary Table

The invention claimed is:

1. A vertical machining center for machining a workpiece by relatively moving a tool and the workpiece, comprising:
an X-axis guide configured to guide a table in left and right direction on a bed;
a column provided on the bed and having an opening formed to span the X-axis guide in forward and backward direction so as to allow the table to enter in the left and right direction,
a saddle provided to move in the forward and backward direction along a first Y-axis guide extending in the forward and backward direction and a second guide which are disposed at a top portion of the column, the second guide disposed below, parallel to and offset in the left and right direction from the first Y-axis guide;
a spindle head disposed at a side of the saddle close to a second Y-axis guide so as to move in a vertical direction;
a protection cover connected to the saddle, and configured to expand and contract according to the forward and backward movement of the saddle,
wherein a guide rail, configured to slidably support the protection cover, is extended through a through hole in the saddle, whereby an upper end of the protection cover is positioned lower than a height of the saddle.

2. The machining center of claim 1, further comprising:
a moving body movable in the left and right direction along the X-axis guide; and
a cradle supported at the ends thereof by the moving body with rotating shafts extending parallel to the X-axis, wherein the table is disposed on the cradle.

3. The machining center of claim 1, wherein the spindle head is mounted to the head stock so as to move vertically relative to the saddle,
wherein a cable for power supply or control, or a pipe for machining fluid or coolant is passed through a first fixture secured to the saddle or the spindle head and a second fixture secured to the column so as to be loosely held above a slant-shaped top portion of the column.

* * * * *